United States Patent [19]

Nishimoto et al.

[11] Patent Number: 5,539,055
[45] Date of Patent: Jul. 23, 1996

[54] ANTISTATIC NONFLAMMABLE RESIN COMPOSITION

[75] Inventors: Kenji Nishimoto, Miki; Yoshihiko Hashimoto, Ibaraki, both of Japan

[73] Assignee: Kanegafuchi Kagaku Kogyo Kabushiki Kaisha, Osaka, Japan

[21] Appl. No.: 389,742

[22] Filed: Feb. 15, 1995

Related U.S. Application Data

[63] Continuation of Ser. No. 183,435, Jan. 19, 1994, abandoned.

[30] Foreign Application Priority Data

Jan. 21, 1993 [JP] Japan ................................. 5-027353

[51] Int. Cl.$^6$ .................... C08L 27/06; C08L 25/04
[52] U.S. Cl. .................... 525/239; 525/241; 525/96; 524/160; 524/161; 524/178; 524/179; 524/180; 524/418; 524/421
[58] Field of Search .................... 525/96, 239, 241; 524/418, 421, 179, 180, 178, 160, 161

[56] References Cited

U.S. PATENT DOCUMENTS

| 3,507,827 | 4/1970 | Pollock | 260/45.75 |
| 4,670,490 | 6/1987 | Yoshida et al. | 524/115 |
| 5,116,909 | 5/1992 | Mishima et al. | 525/227 |
| 5,208,288 | 5/1993 | Mishima et al. | 525/84 |

*Primary Examiner*—W. Robinson H. Clark
*Attorney, Agent, or Firm*—Armstrong, Westerman, Hattori, McLeland & Naughton

[57] ABSTRACT

An antistatic nonflammable resin composition comprising: (A) 30 to about 80 weight percent a styrene resin; (B) 70 to about 20 weight percent of a vinyl chloride resin; (C) 0.5 to about 5 weight parts based on (A)+(B) of at least one antistatic agent selected from the group consisting of alkyl sulfonates and alkyl benzene sulfonates; and (D) 0.1 to about 5 weight parts based on (A)+(B) of at least one organic tin stabilizer containing sulfur. Molded articles from said composition possess a good appearance, excellent antistatic property and dust-repellency on the surface thereof.

1 Claim, No Drawings

ANTISTATIC NONFLAMMABLE RESIN COMPOSITION

This is a continuation of application Ser. No. 08/183,435 filed Jan. 19, 1994, now abandoned.

BACKGROUND OF THE INVENTION

1. Field of the Invention

The present invention relates to an antistatic nonflammable resin composition, more particularly, to an antistatic nonflammable resin composition excellent in antistatic property, mechanical properties and moldability and the surface of molded articles thereof such as housings and cases of OA appliances e.g. electronic or electric appliances, being dust-repellent.

2. Description of the Prior Art

Nonflammable resins for injection molding comprising a low molecular weight styrene-based resin and a vinyl chloride resin of low polymerization degree with their excellent mechanical properties and cost merits are being used increasingly as housing materials for OA appliances. As plastics, however, these materials are high in surface resistivity, this leading to a defect of attracting dust et cetera. For the elimination of this defect, various methods are being studied but most of them are not so effective for the improvement of antistatic property and, still worse, have defects of causing generation of flash lines and/or black streaks on the surface of molded articles or causing deterioration of mechanical properties.

SUMMARY OF THE INVENTION

An object of the present invention is to provide an antistatic nonflammable resin composition excellent in antistatic property, mechanical properties and moldability, being dust-repellent and particularly suited for injection molding.

Other objects and advantages of the present invention will be apparent from the detailed description below.

The present inventors have found out, after a series of studies for improving antistatic property and moldability of resins, that the above objects can be attained by a composition comprising a styrene-based resin, a vinyl chloride-based resin, an antistatic agent and an organic tin stabilizer containing sulfur.

DETAILED DESCRIPTION OF THE INVENTION

The present invention relates to an antistatic nonflammable resin composition comprising the following components (A), (B), (C) and (D), and 0.5~5 weight parts of the component (C) and 0.1~5 weight parts of the component (D) being added respectively to 100 weight parts of a nonflammable resin comprising 30~80 weight % of the component (A) and 70~20 weight % of the component (B):

(A) a styrene-based resin wherein a reduced viscosity of the park soluble in methyl ethyl ketone is 0.20–0.55 dl/g (N,N-dimethylformamide solution, 30° C., concentration 0.3 g/dl), (B) a vinyl chloride-based resin having an average degree of polymerization of 400–800, and (C) at least one member of antistatic agents selected from the group consisting of alkyl sulfonates of the general formula (I) and alkyl benzene sulfonates of the general formula (II)

$R^1SO_3M$     (I)

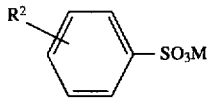
(II)

wherein, $R^1$, $R^2$ show straight chains or branched chain alkyl groups 8~22 in carbon number and M shows an alkali metal, and (D) at least one member of organic tin stabilizers containing sulfur selected from the group consisting of dimethyltin mercapto glycolate, dibutyl tin mercapto propionate, dioctyl tin mercapto propionate, dibutyl tin bis(alkyl 3-mercapto propionate), dioctyl tin bis(alkyl 3-mercapto propionate) and dimethyl tin bis(alkyl 2-mercapto glycolate).

The styrene-based resin of the component (A) has a reduced viscosity of the part soluble in methyl ethyl ketone is 0.20~0.55 dl/g in a 0.3 g/dl solution of N,N-dimethylformamide at 30° C. The styrene-based resin involves all of normal styrene resins well compatible with vinyl chloride resins such as ABS resins, AS resins, MBS resins, MABS resins, acrylonitrile-butadiene-styrene-α-methyl styrene copolymers, acrylonitrile-methyl methacrylate-butadiene-styrene-α-methyl styrene copolymers, acrylonitrile-butadiene-styrene-α-methyl styrene-maleimide copolymers, AAS resins, AES resins, styrene-maleic anhydride copolymers, styrene-maleimide copolymers. These are usable singly or in combination of two or more. When the reduced viscosity of the part soluble in methyl ethyl ketone is less than 0.2 dl/g, the impact strength decreases and, when it exceeds 0.55 dl/g, the fluidity becomes lower with the simultaneous deterioration of the thermal stability during molding.

The proportion of the component (A) is 30~80 weight %, preferably, 35~75 weight %. When the component (A) exceeds 80 weight %, the impact strength notoriously lowers, and when it is less than 30 weight %, the proportion of vinyl chloride-based resin increases relatively with the simultaneous lowering of the moldability.

The vinyl chloride-based resin of the component (B) is 400~800, preferably, 450~750 in an average degree of polymerization and includes a homopolymer of vinyl chloride, copolymers containing not less than 80 weight % of vinyl chloride, and chlorinated polyvinyl chloride. Copolymers may include not more than 20 weight % of monovinylidene compounds such as ethylene, vinyl acetate, methyl methacrylate and butyl acrylate.

The proportion of the component (B) is 70~20 weight %, preferably, 65~25 weight %. When the average degree of polymerization is less than 400, the impact strength is lowered, while, when it is in excess of 800, there results a marked lowering of fluidity.

The component (C), which is blended with the components (A) and (B), an antistatic agent excellent in mechanical properties and moldability and preventing dust deposition on the surface of molded articles, is at least one kind of antistatic agents selected from the group consisting of alkyl sulfonates of the general formula (I) and alkyl benzene sulfonates of the general formula (II)

$R^1SO_3M$     (I)

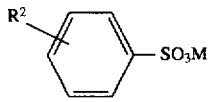
(II)

wherein, $R^1$, $R^2$ show straight chains or branched chain alkyl groups 8~22 in carbon number and M shows an alkali metal.

The general formula (I) includes, for example, $C_{12}H_{25}SO_3Na$, $C_{14}H_{29}SO_3Na$ and $C_{16}H_{33}SO_3Na$, while the general formula (II) includes, for example, the following compound:

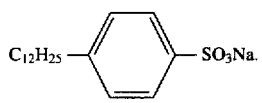

The quantity of the component (C) is 0.5–5 weight parts, preferably, 1–3 weight parts per 100 weight parts of the components (A) and (B). When it is less than 0.5 weight parts, improvement of antistatic property is insufficient, while, when it is in excess of 5 weight parts, there results marked lowering of impact strength.

The component (D) includes, for example, dimethyl tin mercapto glycolate, dibutyl tin mercapto propionate, dioctyl tin mercapto propionate, dibutyl tin bis(alkyl 3-mercapto propionate), dioctyl tin bis(alkyl 3-mercapto propionate) and dimethyl tin bis(alkyl 2-mercapto glycolate). In those compounds, the alkyl indicates an alkyl having 4–12 carbon atoms and octyl is preferable. Those are usable singly or in combination of two or more.

The quantity of the component (D) is 0.1–5 weight parts, preferably, 0.5–2.5 weight parts per 100 weight parts of the components (A) and (B). When it is less than 0.1 weight part, the heat stability is insufficient, while, when it is in excess of 5 weight parts, the heat resistance lowers.

Synthesis of the components (A), (B), (C) and (D) is feasible by any of the known methods.

The antistatic nonflammable resin composition of the present invention may well be used in combination with anti-oxidation agents, thermal stabilizers and lubricants and, if necessary, with UV absorbers, pigments, fire retardants and fire retarding auxiliaries. Especially, phenol-based antioxidants and phosphite-based stabilizers used for styrene resins, tin-based and lead-based stabilizers and various fatty acid esters used as additives for vinyl chloride-based resins, inner and outer lubricants such as metallic soaps may normally be effectively used for improving the performance of the composition of the present invention for use as injection molding resins. The composition of the present invention including vinyl chloride-based resins has a good fire retardancy but, when still higher fire retardancy is required, may further contain small quantities of fire retarding auxiliaries such as halogen-based fire retardants and antimony compounds.

Injection molding is feasible with the composition of the present invention in pellet or powder form. Pellets can be prepared with a normal extruder under conditions not causing deterioration of vinyl chloride-based resins without specific limitation with regard to a screw form, extruding temperature, extruding speed et cetera.

Moreover, injection molding is also possible with a normal injection molder under conditions not causing deterioration of vinyl chloride-based resins, and a screw form, injection temperature, injection speed and pressure are not specifically limited.

Hereinafter, the present invention will be explained in more detail with regard to examples, wherein "parts" mean "weight parts", unless otherwise noted.

EXAMPLES 1–4, COMPARATIVE EXAMPLES 1–4

(A) Synthesis of styrene-based resin

A styrene-based resin comprising 20 parts of acrylonitrile, 80 parts of styrene and 20 parts of butadiene and 0.35 dl/g in reduced viscosity ($\eta$ sp/c) was obtained by a known emulsion polymerization method.

(B) Vinyl chloride-based resin

A vinyl chloride resin 590 in an average degree of polymerization (KANEVINYL S 600, registered trademark of Kanegafuchi Kagaku Kogyo Kabushiki Kaisha) was used.

50 parts of the styrene-based resin synthesized in (A) above, 50 parts of the vinyl chloride-based resin mentioned in (B) above, dibutyl tin bis(octyl 3-mercapto propionate) (D) and dibutyl tin maleate, in amounts shown in Table 1 as tin stabilizers, and 1 part of glycerine tristearate as an inner lubricant were mixed as a common mixture and it was blended with an antistatic agent (C) in Super Mixer in proportions shown in Table 1, pelletized thereafter in a 40 mm extruder, the resulting pellets were dried for not less than 3 hours at 80° C., and flat plates and test pieces for the test of physical properties were prepared by injection molding and supplied for the measurement of their physical properties.

The reduced viscosity of the styrene-based resin was measured in the following way.

The part of styrene-based resin soluble in methyl ethyl ketone was dissolved in N,N-dimethylformamide to be a high polymer solution of 0.3 g/dl and its passing time (t) was measured at 30° C. using Ubbellohde's viscometer (Automatic capillary viscometer, manufactured by Shibayama Kagaku Kiki Seisakusho) according to JIS-K6721. Meanwhile, with regard to the solvent N,N-dimethylformamide, too, the passing time ($t_0$) was measured at 30° C. using the same viscometer and the reduced viscosity ($\eta$ red) was calculated by the following formula.

$$\eta red = (t/t_0 - 1)/C$$

wherein C represents the concentration of the polymer solution.

For comparison, with regard to a commercially available ABS resin (KANE ACE MUH, registered trademark of Kanegafuchi Kagaku Kogyo Kabushiki Kaisha), too, test pieces were prepared in the same way for the measurement of its physical properties.

The methods for evaluation of physical properties were as follows.

(1) Izod impact strength

Measurement was made at 23° C. with a notched test piece (¼ inch thick) according to ASTM (D256).

(2) Surface resistivity

Measurement was made according to ASTM (D257).

(3) Dust deposition on the surface of molded articles

Box-like molded articles 120 g in weight were prepared and were left to stand for 1 month and the degree of dust deposition was observed by naked eyes. The results were shown according to the following criteria:

Good: Deposition of dust is not noticeable.

Bad: Deposition of dust is noticeable in a dark layer.

(4) Black streaks on the surface of molded articles

The presence or absence of the black streaks on the surface of the box-like molded articles was observed by naked eyes.

The results were shown in Table 1.

As apparent from the above examples and comparative examples, the composition of the present invention provides a good material for housings of OA appliances et cetera required to be highly dust-repellent, and improved in antistatic property without marked lowering of impact strength.

TABLE 1

| | | Examples | | | | Comp. Examples | | | |
|---|---|---|---|---|---|---|---|---|---|
| | | 1 | 2 | 3 | 4 | 1 | 2 | 3 | 4 |
| Composition (parts) | Styrene-based resin (A) | 50 | 50 | 50 | 50 | 50 | 50 | 50 | ABS commercially available (KANE ACE MUH) |
| | Vinyl chloride-based resin (B) | 50 | 50 | 50 | 50 | 50 | 50 | 50 | |
| | Antistatic agent (C) | | | | | | | | |
| | $C_{14}H_{29}SO_3Na$ | 1.5 | 2.0 | — | 2.0 | — | 0.2 | 2 | |
| | $C_{12}H_{25}C_6H_4SO_3Na$ | — | — | 2.0 | — | — | — | — | |
| | Organic tin stabilizer (D) D1 | 1 | 1 | 1 | 2 | 1 | 1 | — | |
| | Other orgainic tin stabilizer D2 | 2 | 2 | 2 | — | 2 | 2 | 3 | |
| Properties | IZOD impact strength (kg · cm/cm) | 26.8 | 20.3 | 18.1 | 22.0 | 32.3 | 30.9 | 19.0 | 13.0 |
| | Surface resistivity [Ω] | $3.2 \times 10^{10}$ | $1.2 \times 10^{10}$ | $5.2 \times 10^{10}$ | $2.5 \times 10^{10}$ | $>10^{15}$ | $>10^{15}$ | $2.0 \times 10^{10}$ | $>10^{15}$ |
| | Degree of dust deposition (by naked eyes) | Good | Good | Good | Good | Bad | Bad | Good | Bad |
| | Black streaks (by naked eyes) | Absence | Absence | Absence | Absence | Absence | Absence | Presence | Absence |

D1: dibutyl tin bis(octyl 3-mercapto propionate)
D2: dibutyl tin maleate

As stated above, the antistatic nonflammable composition of the present invention has excellent antistatic properties and is a good material for molded articles with their surface dust-repellent and excellent in appearance.

What is claimed is:

1. An antistatic nonflammable resin composition consisting of:

30–80 weight % of a styrene resin wherein the part soluble in methyl ethyl ketone has a reduced viscosity of 0.20–0.55 dl/g, as measured in N,N-dimethylformamide at 30° C. at a concentration of 0.3 g/dl;

70–20 weight % of a vinyl chloride resin having an average degree of polymerization of 400–800;

0.5–5 parts of an antistatic agent of the formula $C_{14}H_{29}SO_3Na$ or $C_{12}H_{25}C_6H_4SO_3Na$ per 100 parts of said resins, and 0.1–5 parts of an organic tin stabilizer of the formula dibutyl tin bis(octyl 3-mercapto propionate) or dibutyl tin mercapto propionate per 100 parts by weight of said resins.

* * * * *